Sept. 28, 1948.	J. E. KRILOW	2,450,346
KITCHEN UTENSIL
Filed May 16, 1944

Inventor
James E. Krilow
Attorney

Patented Sept. 28, 1948

2,450,346

UNITED STATES PATENT OFFICE 2,450,346

KITCHEN UTENSIL

James E. Krilow, Atlantic City, N. J., assignor to Boardwalk Enterprises, Inc., Atlantic City, N. J., a corporation of New Jersey Application May 16, 1944, Serial No. 535,786

2 Claims. (Cl. 30—278)

This invention relates to kitchen utensils such as are commonly employed for preparing vegetables, and particularly to mounting of the cutting elements in the grip portion or handle.

The object of this invention is to provide simplified means for controlling the oscillating movement of the paring blade such as is disclosed in the patent to Murdock No. 2,220,169 and a practical and efficient means for rigidly and securely mounting the slitting blades.

Another object of this invention is to provide a handle portion that comprises a complete operative closure for the supporting element of the paring blade while permitting an oscillating movement thereof.

Another object of the invention is to provide a kitchen utensil in which the handle portion may be cheaply and easily manufactured from suitable plastic materials, said handle being bisectional complementary sections into which the cutting elements are inserted and the respective sections rigidly secured to each other to provide an integral one-piece structure.

A further object of the invention is to provide socket openings in said handle for rigidly enclosing the ends of the slitting blades to prevent angular movement of said blades such as frequently occurs in the present devices and which often results in the blades being forced out of their retaining frame thereby resulting in loss of the blades and possible injury to the user.

Other objects and advantages of the present invention will be apparent as hereinafter exemplified.

In the accompanying drawings.

Reference characters indicate the same parts in the several drawings.

Figure 1:
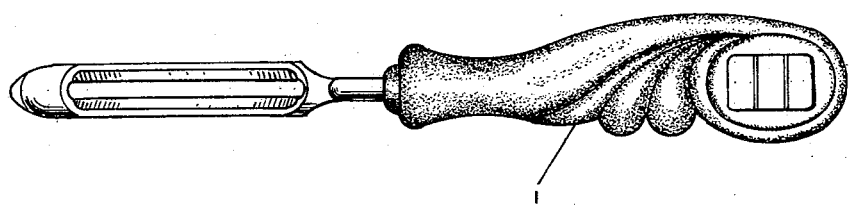
Figure 1 is a perspective view of the device.
Figure 2:
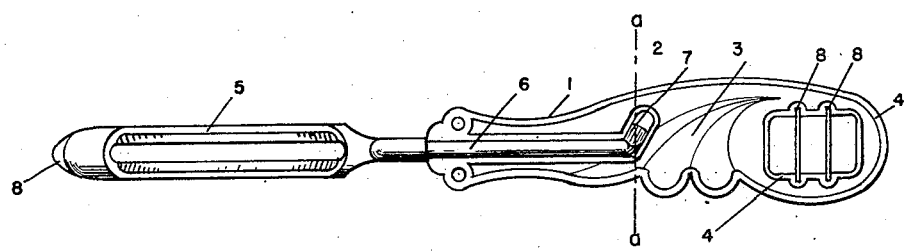
Figure 2 is a plan view of the half portion of the handle or grip portion of the device.

In the practice of the invention, the handle 1, as shown in Figure 1, comprises complementary sections, preferably formed of plastic material, the lower half of the handle being shown in Figure 2. In order to reduce the material weight of said handle for convenience of using, as well as to reduce the cost of manufacture, it is relieved or hollowed out at 3, and only cementing or heat sealing lands 4 are left to provide a plane surface for joining the respective sections.

Figure 3:
Figure 3 is a fragmentary view of one end of the blade rod showing the bent wedge shaped end.
Figure 4:
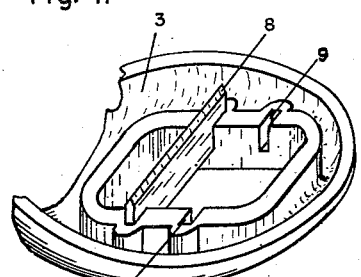
Figure 4 is a fragmentary section showing the slitting blade mounting socket.

The paring blade 5 is of the conventional type well known in the art and has mounted therein a round rod 6, the end of said rod being bent at an angle of approximately 30° and wedge shaped as shown in Figure 3. The degree of angularity is not important and is principally provided as a means for taking the thrust of the blade when using the tip end 8 for removing eyes from potatoes or spots in vegetables and to prevent the blade from disengaging itself from the handle. The wedge formation at the end of the rod 6 permits oscillation or partial rotation of the blade to enable the blade to follow the contour of the vegetable. The wedge formation also permits partial rotation within a limited space without increasing the thickness of the handle.

The rod 6 is of a diameter to substantially fill the socket portions of the complementary handle sections of the handle 1 in which it is positioned but to permit rotation therein. The angular wedge shaped end 7 of the rod being of a reduced diameter as clearly shown in Figure 3 permits an oscillation or slight rotation of the rod and blade 5.

The slitting blades 8 which are made of spring steel sharpened at one or both edges, are placed in suitable sockets in ribs 9 formed in the relieved handle sections which completely encompass both ends of the blades 8 holding them rigidly secure against rear end flexing pressure that may be exerted when beans or other vegetables are being split. When blades of this character, by reason of their extreme thinness, are mounted in a slot or aperture in thin metal, the short rear end of the blade has sufficient freedom to permit angular lateral movement when the blade is flexed by lateral pressure thereby causing the blade to be snapped out of the retaining receptacle with possible injury to the user. The method of mounting the blade 8 in the socket in the rib 9 which rigidly holds the blade against thrust or lateral rear end movement obviates any danger of the blade being forced from the device. It has been found desirable to use two blades as shown in the respective drawings thereby decreasing the degree of resistance offered by the vegetable being slit and incidently increasing the lateral stability of the blade against flexing action.

Figure 5:
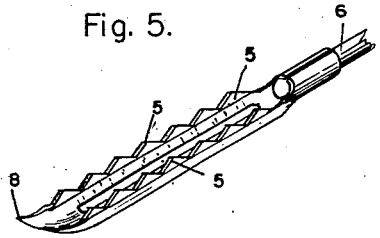
Figure 5 is a perspective fragmentary view of the blade showing scraping or scaling edges.

A plurality of teeth or serrations 5' are disposed on the reverse side of the paring blade 5, as shown in Figure 5, and are provided as a means for scraping vegetables or scaling fish, thereby increasing the utility.

I claim:

1. A kitchen utensil including a bi-sectional handle having meeting faces each of which has a semi-cylindrical groove extending inwardly from one end to form a socket when the handle sections are assembled, a guided paring blade substantially coaxial with the handle and having an extension rotatably mounted in said socket, an offset recess for the socket formed by alined offsets on the grooves of each handle section, and a wedge shaped reduced offset on the blade extension positioned in the offset recess of the socket to limit rotation of the blade.

2. A kitchen utensil including a handle having an end socket terminating in an offset portion, said socket being of substantially equal diameter throughout its length, a guided paring blade coaxial with the handle and having an extension rotatably mounted in the straight portion of the socket, and a wedge shaped reduced offset terminal on the extension positioned in the offset portion of the socket to limit rotation of the blade.

JAMES E. KRILOW.

REFERENCES CITED

The following references are of record in the file of this patent:

UNITED STATES PATENTS

| Number | Name | Date |
|---|---|---|
| 2,142,137 | Leary | Jan. 3, 1939 |
| 2,220,169 | Murdock | Nov. 5, 1940 |
| 2,265,504 | Zimmer | Dec. 9, 1941 |
| 2,351,327 | Gamache | June 13, 1944 |